United States Patent
Du et al.

(10) Patent No.: US 11,131,992 B2
(45) Date of Patent: Sep. 28, 2021

(54) MULTI-LEVEL COLLABORATIVE CONTROL SYSTEM WITH DUAL NEURAL NETWORK PLANNING FOR AUTONOMOUS VEHICLE CONTROL IN A NOISY ENVIRONMENT

(71) Applicants: DENSO International America, Inc., Southfield, MI (US); Sriram Subramanian, Waterloo (CA); Sushrut Bhalla, Waterloo (CA); Jaspreet Sambee, Waterloo (CA); Mark Crowley, Waterloo (CA); Sebastian Fischmeister, Waterloo (CA); Donghyun Shin, Waterloo (CA); William Melek, Waterloo (CA); Baris Fidan, Waterloo (CA); Ami Woo, Waterloo (CA); Bismay Sahoo, Waterloo (CA)

(72) Inventors: Zhiyuan Du, West Bloomfield, MI (US); Joseph Lull, South Haven, MI (US); Rajesh Malhan, Troy, MI (US); Sriram Subramanian, Waterloo (CA); Sushrut Bhalla, Waterloo (CA); Jaspreet Sambee, Waterloo (CA); Mark Crowley, Waterloo (CA); Sebastian Fischmeister, Waterloo (CA); Donghyun Shin, Waterloo (CA); William Melek, Waterloo (CA); Baris Fidan, Waterloo (CA); Ami Woo, Waterloo (CA); Bismaya Sahoo, Waterloo (CA)

(73) Assignees: DENSO International America, Inc., Southfield, MI (US); Sriram Subramanian, Waterloo (CA); Sushrut Bhalla, Waterloo (CA); Jaspreet Sambee, Waterloo (CA); Mark Crowley, Waterloo (CA); Sebastian Fischmeister, Waterloo (CA); Donghyun Shin, Waterloo (CA); William Melek, Waterloo (CA); Baris Fidan, Waterloo (CA); Ami Woo, Waterloo (CA); Bismay Sahoo, Waterloo (CA)

( * ) Notice: Subject to any disclaimer, the term of this patent is extended or adjusted under 35 U.S.C. 154(b) by 126 days.

(21) Appl. No.: 16/206,506
(22) Filed: Nov. 30, 2018
(65) Prior Publication Data
US 2020/0174471 A1   Jun. 4, 2020

(51) Int. Cl.
   *G05D 1/00*     (2006.01)
   *G05D 1/02*     (2020.01)
   (Continued)

(52) U.S. Cl.
   CPC ......... *G05D 1/0088* (2013.01); *G05D 1/0221* (2013.01); *G06N 3/0454* (2013.01); *G06N 3/08* (2013.01); *G05D 2201/0213* (2013.01)

(58) Field of Classification Search
   CPC .......... G06N 3/02; G06N 3/0454; G06N 3/08; G05D 1/088; G05D 1/0221; G05D 1/0088

See application file for complete search history.

(56) References Cited

U.S. PATENT DOCUMENTS

| 7,123,169 B2 | 10/2006 | Farmer et al. |
| 7,211,980 B1 | 5/2007 | Bruemmer et al. |

(Continued)

FOREIGN PATENT DOCUMENTS

| CN | 102117071 A | 7/2011 |
| CN | 102231233 A | 11/2011 |

(Continued)

OTHER PUBLICATIONS

Tram et al., Learning Negotiating Behavior Between Cars in Intersections using Deep Q-Learning, Oct. 24, 2018, IEEE (Year: 2018).*

(Continued)

*Primary Examiner* — Thomas G Black
*Assistant Examiner* — Sara J Lewandroski
(74) *Attorney, Agent, or Firm* — Harness, Dickey & Pierce, P.L.C.

(57) ABSTRACT

A RLP system for a host vehicle includes a memory and levels. The memory stores a RLP algorithm, which is a (Continued)

multi-agent collaborative DQN with PER algorithm. A first level includes a data processing module that provides sensor data, object location data, and state information of the host vehicle and other vehicles. A second level includes a coordinate location module that, based on the sensor data, the object location data, the state information, and a refined policy provided by the third level, generates an updated policy and a set of future coordinate locations implemented via the first level. A third level includes evaluation and target neural networks and a processor that executes instructions of the RLP algorithm for collaborative action planning between the host and other vehicles based on outputs of the evaluation and target networks and to generate the refined policy based on reward values associated with events.

18 Claims, 8 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 7,343,222 | B2 | 3/2008 | Solomon |
| 7,587,260 | B2 | 9/2009 | Bruemmer et al. |
| 8,073,564 | B2 | 12/2011 | Bruemmer et al. |
| 8,706,394 | B2 | 4/2014 | Trepagnier et al. |
| 8,965,677 | B2 | 2/2015 | Breed et al. |
| 9,015,093 | B1 | 4/2015 | Commons |
| 9,792,575 | B2 | 10/2017 | Khasis |
| 9,939,817 | B1 | 4/2018 | Kentley-Klay et al. |
| 10,649,453 | B1* | 5/2020 | Svegliato ............... B60W 60/00 |
| 10,671,075 | B1* | 6/2020 | Kobilarov ............. G05D 1/0088 |
| 10,671,076 | B1* | 6/2020 | Kobilarov ............. G05D 1/0255 |
| 10,733,510 | B2* | 8/2020 | Nageshrao ............... G06N 3/08 |
| 2006/0121418 | A1 | 6/2006 | DeMarco et al. |
| 2007/0021879 | A1 | 1/2007 | DelNero et al. |
| 2007/0021880 | A1 | 1/2007 | Appleby et al. |
| 2010/0017046 | A1 | 1/2010 | Cheung et al. |
| 2013/0219294 | A1 | 8/2013 | Goldman-Shenhar et al. |
| 2015/0284010 | A1 | 10/2015 | Beardsley et al. |
| 2016/0207538 | A1 | 7/2016 | Urano et al. |
| 2018/0004227 | A1 | 1/2018 | Browning et al. |
| 2018/0032082 | A1 | 2/2018 | Shalev-Shwartz et al. |
| 2018/0173243 | A1* | 6/2018 | Park ......................... G06N 3/04 |
| 2019/0310632 | A1* | 10/2019 | Nakhaei Sarvedani . G06N 3/08 |
| 2019/0311042 | A1* | 10/2019 | Li ......................... G06F 16/2477 |
| 2019/0332110 | A1* | 10/2019 | Isele ..................... G05D 1/0088 |
| 2019/0339702 | A1* | 11/2019 | Isele ....................... G06N 3/006 |
| 2020/0010084 | A1* | 1/2020 | Pathak ................ B60W 30/165 |
| 2020/0026277 | A1* | 1/2020 | Palanisamy ............ G06N 7/005 |
| 2020/0033868 | A1* | 1/2020 | Palanisamy ........... B60W 40/09 |
| 2020/0033869 | A1* | 1/2020 | Palanisamy ............ G06N 3/006 |
| 2020/0062262 | A1* | 2/2020 | Kusari .................... G08G 1/164 |
| 2020/0074302 | A1* | 3/2020 | Goto ....................... G06N 5/025 |
| 2020/0074354 | A1* | 3/2020 | Qin .......................... G08G 1/202 |
| 2020/0081436 | A1* | 3/2020 | Kizumi ................... G06N 20/00 |
| 2020/0086862 | A1* | 3/2020 | Cui .................... B60W 30/0956 |
| 2020/0142420 | A1* | 5/2020 | Kusari ................. G05D 1/0221 |
| 2020/0142421 | A1* | 5/2020 | Palanisamy ........ G06K 9/00791 |
| 2020/0150672 | A1* | 5/2020 | Naghshvar ........... G05D 1/0231 |
| 2020/0160168 | A1* | 5/2020 | Yang ..................... G06N 3/0454 |
| 2020/0174490 | A1* | 6/2020 | Ogale .................. G05D 1/0221 |
| 2020/0247402 | A1* | 8/2020 | Bouton ................ G06N 3/0445 |
| 2020/0346666 | A1* | 11/2020 | Wray ................. B60W 60/0025 |
| 2020/0401148 | A1* | 12/2020 | Hong ................... G05D 1/0246 |
| 2021/0009154 | A1* | 1/2021 | Wray ..................... G08G 1/164 |

FOREIGN PATENT DOCUMENTS

| | | |
|---|---|---|
| CN | 103370249 A | 10/2013 |
| KR | 101736306 B1 | 5/2017 |

OTHER PUBLICATIONS

"Learning to Coordinate with Deep Reinforcement Learning in Doubles Pong Game," Diallo, et al., Machine Learning and Applications (ICMLA), 2017 16th IEEE International Conference, pp. 14-19, IEEE, 2017.

"Learning in Large Cooperative Multi-Robot Domains," Fernandez et al., International Journal of Robotics and Automation, special issue on Computational Intelligence Techniques in Cooperative Robots, 2001, vol. 16, n. 4, pp. 217-226.

"Cooperative Multi-agent Control Using Deep Reinforcement Learning," Gupta et al., International Conference on Autonomous Agents and Multiagent Systems, pp. 66-83, Springer, 2017.

"Multi agent Reinforcement Learning in Sequential Social Dilemmas," Leibo et al., Proceedings of the 16th Conference on Autonomous Agents and MultiAgent Systems, pp. 464-473. International Foundation for Autonomous Agents and Multiagent Systems, 2017.

"Prioritized Experience Replay," Schaul et al., Published as a conference paper at ICLR 2016.

"CaRINA Intelligent Robotic Car: Architectural Design and Applications," Fernandes, et al., Mobile Robotics Laboratory, University of Sao Paulo (USP), Preprint submitted to Journal of Systems Architecture, Oct. 30, 2013.

\* cited by examiner

MULTI-LEVEL COLLABORATIVE CONTROL SYSTEM WITH DUAL NEURAL NETWORK PLANNING FOR AUTONOMOUS VEHICLE CONTROL IN A NOISY ENVIRONMENT

FIELD

The present disclosure relates to autonomous and artificial intelligence vehicle systems and corresponding multi-agent collaborative control systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Autonomous vehicles can include multiple control modules, such as an engine control module, a transmission control module, an infotainment control module, a navigation control module, etc. The control modules and/or other electronic devices can communicate with each other over a controller area network (CAN) bus. This may include transmission of CAN messages indicative of states of various parameters. A vehicle typically includes various sensors for detection of states of devices in the vehicle and conditions surrounding the vehicle. The sensors may include, for example, a steering wheel position sensor, a brake pedal position sensor, an accelerator position sensor, temperature sensors, a vehicle speed sensor, an engine speed sensor, cameras, radar sensors, lidar sensors, etc. Information from the sensors and other vehicle information may be shared with the control modules via CAN messages transmitted over the CAN bus. The vehicle information may also be shared among different vehicles in close proximity with each other using vehicle-to-vehicle communication.

An autonomous vehicle may be equipped with a driver assistance module to assist the driver in operating the vehicle. The driver assistance module may monitor host vehicle information and other vehicle information via, for example, CAN messages and determine parameters of the host vehicle and other vehicles and environmental conditions. Based on this information, the driver assistance module may assist the driver by generating, for example, warning signals and/or performing operations to brake, steer and/or control acceleration and speed of the vehicle. This may include, for example, maintaining the host vehicle in a traffic lane and/or merging the vehicle into an adjacent traffic lane to avoid a collision.

SUMMARY

A reinforcement learning and planning (RLP) system for a host vehicle is provided. The RLP system includes a memory and first, second and third levels. The memory is configured to store a RLP algorithm, which is a multi-agent collaborative deep Q network (DQN) with prioritized experience replay (PER) algorithm. The first level includes a data processing module configured to provide sensor data, object location data, and state information of multiple vehicles including the host vehicle and multiple other vehicles. The second level includes a coordinate location module configured to, based on the sensor data, the object location data, the state information, and a refined policy provided by the third level, generate an updated policy and a first set of future coordinate locations to be implemented via the first level. The third level includes an evaluation network, a target network, and a processor configured to execute instructions of the RLP algorithm (i) for collaborative action planning between the host vehicle and the other vehicles based on outputs of the evaluation network and the target network, and (ii) to generate the refined policy based on reward values associated with multiple events. The evaluation network and the target network are neural networks.

In other features, a method of operating a host vehicle is provided. The method includes: storing a reinforcement learning and planning (RLP) algorithm, which is a multi-agent collaborative deep Q network (DQN) with prioritized experience replay (PER) algorithm. The method further includes: providing at a first level sensor data, object location data, and state information of multiple vehicles including the host vehicle and multiple other vehicles; at a second level and based on the sensor data, the object location data, the state information, and a refined policy provided by a third level, generating an updated policy and a first set of future coordinate locations to be implemented via the first level; and at a third level, executing instructions of the RLP algorithm via a processor (i) for collaborative action planning between the host vehicle and the other vehicles based on outputs of an evaluation network and a target network, and (ii) to generate the refined policy based on reward values associated with multiple events. The third level includes the evaluation network and the target network. The evaluation network and the target network are neural networks.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
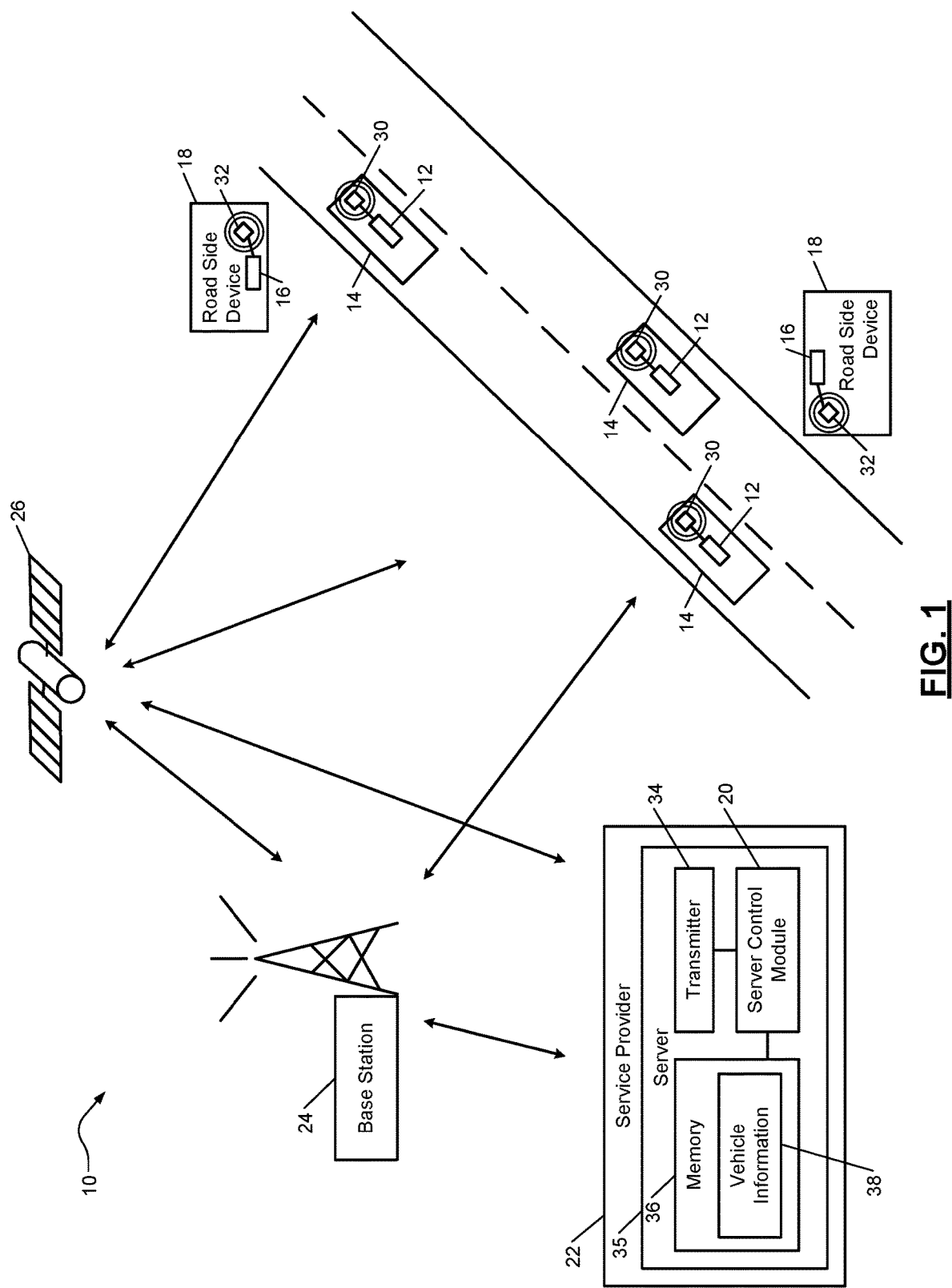
FIG. 1 is a functional block diagram of an example of a driver assistance system incorporating a reinforcement learning and planning (RLP) module in accordance with an embodiment of the present disclosure.

Recent intelligent vehicles include various sensors and communication devices, which are used to understand host vehicle behavior, driver behavior, and behavior of other vehicles. Driver assistance is provided based on outputs of the sensors, current operating conditions, and a detected operating environment. For example, a steering wheel angle, a brake pedal position, and an accelerator pedal position may be monitored to determine driver behavior while external radar sensor signals and camera images may be monitored to detect a current vehicle environment, which may include other vehicles. As an example, location and movement of lane markers, surrounding objects, signal lights, etc. may be monitored. Driver assistance may be provided to, for example, autonomously steer, brake and/or decelerate the corresponding host vehicle to prevent a collision.

A modular artificial intelligence (AI) system of a vehicle may perform autonomous actions and operate a vehicle to, for example, merge from a first lane of traffic into a second lane of traffic. A modular AI system is an AI system that is applicable to various vehicle environments and follows a set of rules to predict movement (e.g., travel path, speed, acceleration, etc. of nearby vehicles relative to a host vehicle).

Autonomous driving in past years is a leading focus point in the automotive research field and driving in urban and highway traffic is complex. Given the statistics indicating that the number of fatalities in traffic accidents in the last 10 years is 1.2 million per year, autonomous driving is expected to save millions of lives in the future. Apart from orthodox techniques and in order to provide a vehicle with some self-built intelligence, several machine learning (ML) techniques have been introduced, which allow a driving agent to learn from gathered data and improve future operations based on determined experiences. A "driving agent" or "agent" as used herein may refer to a vehicle, a vehicle control module, a driver assistance module, a RLP module, a simulation system control module, a simulated vehicle control module, or other autonomous vehicle module. An agent may refer to a combination of two or more of the stated modules. Current autonomous methods include vehicle individualized intelligence without collaboration that focus operations based on sensory inputs.

The examples provided herein include collaborative multi-agent reinforcement learning. This may be implemented, for example, on a highway, freeway, roadway, or other multi-vehicle environment. The collaborative multi-agent reinforcement learning approach may also be implemented in an actual vehicle environment, in a simulated environment, or other multi-agent environment where multiple agents are able to interact. Each of the agents is able to learn behaviors of that agent and/or corresponding vehicle and behaviors of the other agents and/or corresponding vehicles. The stated behaviors are learned over time based on feedback data, sensor data, and shared data collected in association with different environment states and performed actions. Collaborative systems are disclosed in which the agents share data about the environment and decision making information and based on this information decide on a best course of action to take next. This includes avoiding obstacles, pedestrians and rogue vehicles, which may be un-instrumented and/or non-autonomous vehicles. This aids in preventing a collision. The collaborative systems include teaching agents to drive autonomously and collaboratively in certain scenarios, such as highway scenarios.

The disclosed agents perform collaborative decision making and path planning using trained and continuous learning artificial intelligence (AI) systems to prevent single and series collisions. A single collision refers to a collision between two vehicles. A series collision refers to a multiple consecutive collisions between more than two vehicles, sometimes referred to as a "traffic pile up". Certain traffic conditions may be mixed such that the traffic includes autonomous vehicles, partially autonomous vehicles, and/or non-autonomous (manually driven) vehicles. Other traffic conditions may include only fully autonomous vehicles that are fully connected (i.e. able to communicate with each other and share information).

In the disclosed examples, a RLP algorithm (also referred to as a multi-agent collaborative deep Q network (DQN) with prioritized experience replay (PER) algorithm) is disclosed that provides intelligence for behavior prediction of surrounding vehicles and negotiated path prediction and planning for collision avoidance in automated vehicles. The RLP algorithm is used to facilitate autonomous vehicle learning and predicting of vehicle behaviors and potential driving paths of the vehicles in a particular environment (or local traffic scenario). The prediction of vehicle behaviors and driving paths may be for any number of vehicles in a driving scenario.

The disclosed implementations also include a reinforcement learning (RL) architecture for collaborative, multi-agent planning which is useful for control of spatially distributed agents in a noisy environment. Collaborative driving is needed for future autonomous driving where several autonomous vehicles are in proximity of each other and are sharing state information, action information, decision information, etc. with each other for informed decision making in real time. Complete state information and intended actions of all of the autonomous vehicles in an environment and position information of non-autonomous vehicles may be shared with each autonomous vehicle. In this scenario, the autonomous vehicles are capable of driving collaboratively with each other while evading the non-autonomous vehicles. These maneuvers may be aggressive. The autonomous vehicles are able to learn from experiences of each other and perform better actions over time.

Although the disclosed figures are primarily described with respect to vehicle implementations, the systems, modules, and devices disclosed herein may be used for other applications, where artificial intelligence decisions are made and course of actions are selected. The examples may be utilized and/or modified for various neural networks.

FIG. 1 shows a driver assistance network 10 in a mixed autonomous operating environment. The driver assistance network 10 may include various vehicle communication devices (or devices that transmit vehicle related information), such as vehicle control modules 12 of vehicles 14, road side control modules 16 of road side units (or road side devices) 18, a server control module 20 of a service provider 22, and/or other vehicles communication devices, such as communication devices in a base station 24 or a satellite 26.

The vehicle related information may include messages and/or signals including information pertaining to the vehicles 14 and/or objects within predetermined distances of the vehicles 14. As an example, the server 35 may be implemented as a cloud-based server and the server control module 20 may be implemented as a RLP module. A portion of and/or a version of the RLP algorithm described below may be implemented by each of the vehicle control modules 12, road side control modules 16, and the server control module 20. In addition, one or more levels of the RLP architecture disclosed herein may be implemented by the vehicle control modules 12, road side control modules 16, and the server control module 20.

The vehicles 14 include the vehicles control modules 12 and transceivers 30 for vehicle-to-vehicle communication and communication with the other vehicle communication devices, such as communication with transceivers 32, 34 of the road side devices 18 and the service provider 22. The service provider 22 may include a server 35, which includes the server control module 20, the transceiver 34, and a memory 36. The memory 36 may store vehicle information, such as that described herein, which may be shared with the vehicles 14.

The driver assistance network may be a dedicated short range communication (DSRC) network, a cellular vehicle-to-everything (C-V2X) network, or other vehicle information sharing network including V2X communication. As an example, the DSRC network may be a 1-way or 2-way short to medium range wireless communication system using 75 mega-hertz (MHz) of spectrum in a 5.9 giga-hertz (GHz) band, which is allocated for transfer of automotive information.

Figure 2:
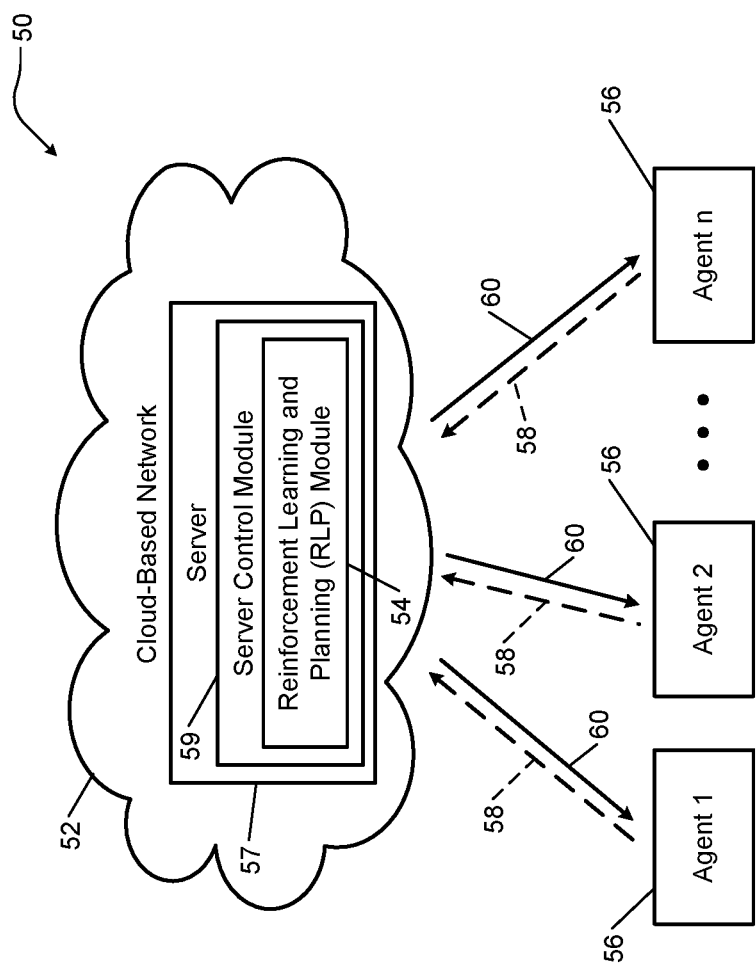
FIG. 2 is a functional block diagram of an example of a reinforcement learning system implemented in a cloud-based network and applied to multiple agents in accordance with an embodiment of the present disclosure.

FIG. 2 an autonomous vehicle system 50 incorporating a RLP system architecture. In the example shown, a cloud-based network 52 is shown including a RLP module 54 that is in communication with multiple agents 56. The cloud-based network 52 may include a server 57 including a server control module 59 having the RLP module 54. Although the RLP module 54 is shown as being implemented in the cloud-based network 52, a similar RLP module may be implanted by each of the agents. The RLP modules implement the RLP system architecture. An example of the RLP system architecture is shown in FIG. 3.

As an example, the each of the agents 56 may refer to one or more modules of a respective vehicle. The agents 56 may transmit first signals 58 including vehicle and/or obstacle information to the RLP module 54 and receive second signals 60 including vehicle control commands. The vehicle and obstacle information may include positions of vehicles and obstacles, states of vehicles, paths of vehicles, etc. The vehicle control information and/or commands may include, for example, requested paths for the vehicles to follow, speeds, action plans, timing information, etc. The agents 56 may refer to, for example, the vehicle control modules 12 and/or the road side control modules 16 of FIG. 1 and the server 57 may refer to the server 35 of FIG. 1.

Figure 3:
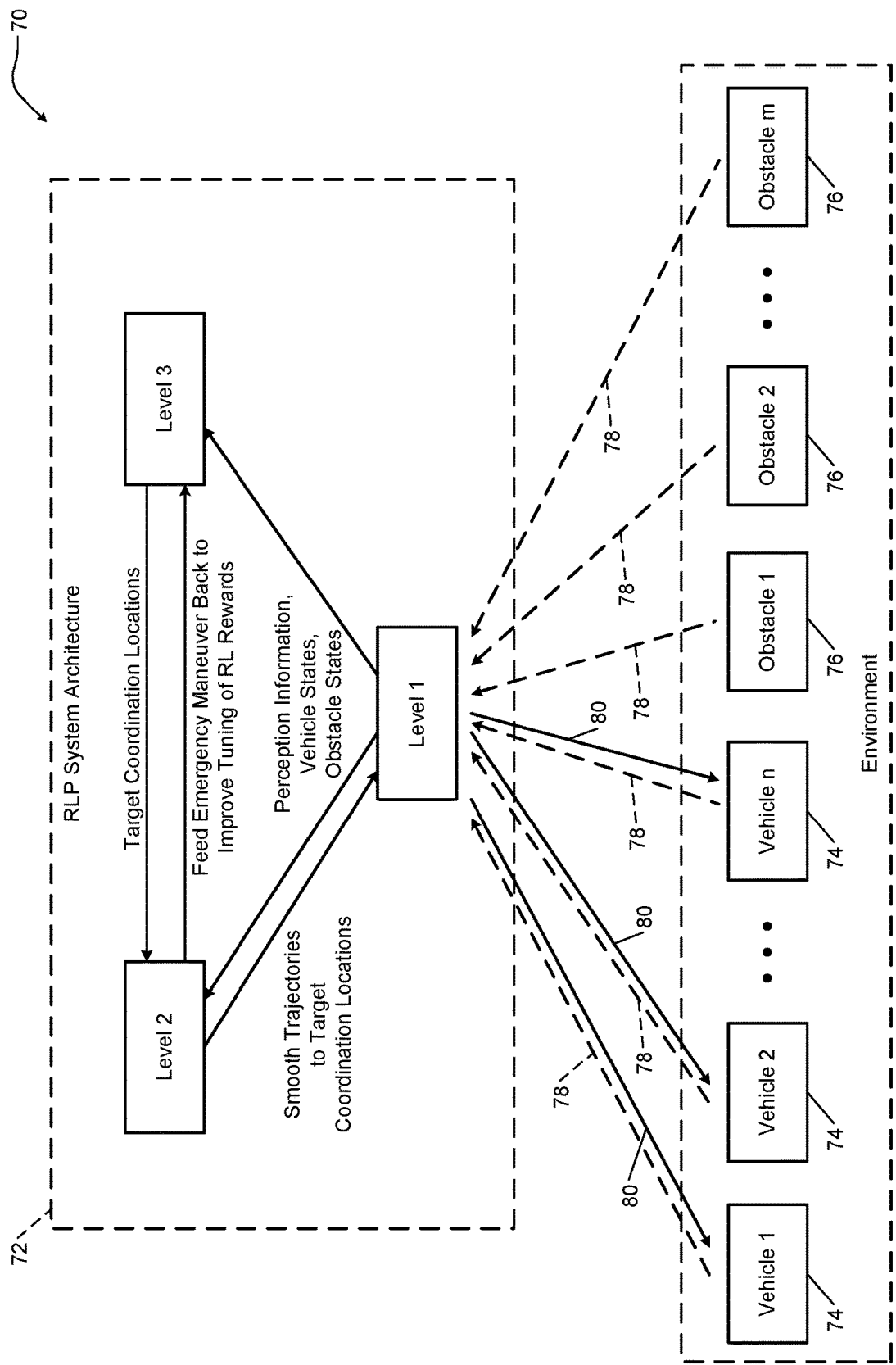
FIG. 3 is a functional block diagram of an example of an autonomous vehicle system incorporating a RLP system architecture in accordance with an embodiment of the present disclosure.

FIG. 3 shows an example of an autonomous vehicle system 70 incorporating a RLP system architecture 72 that has multiple levels L1-L3. Details of the levels are further shown and described with respect to FIG. 5. A portion or all of the RLP system architecture may be implemented by each of a cloud-based network server, a service provider server, a vehicle, a simulator, a road side device, and/or other agent.

Figure 5:
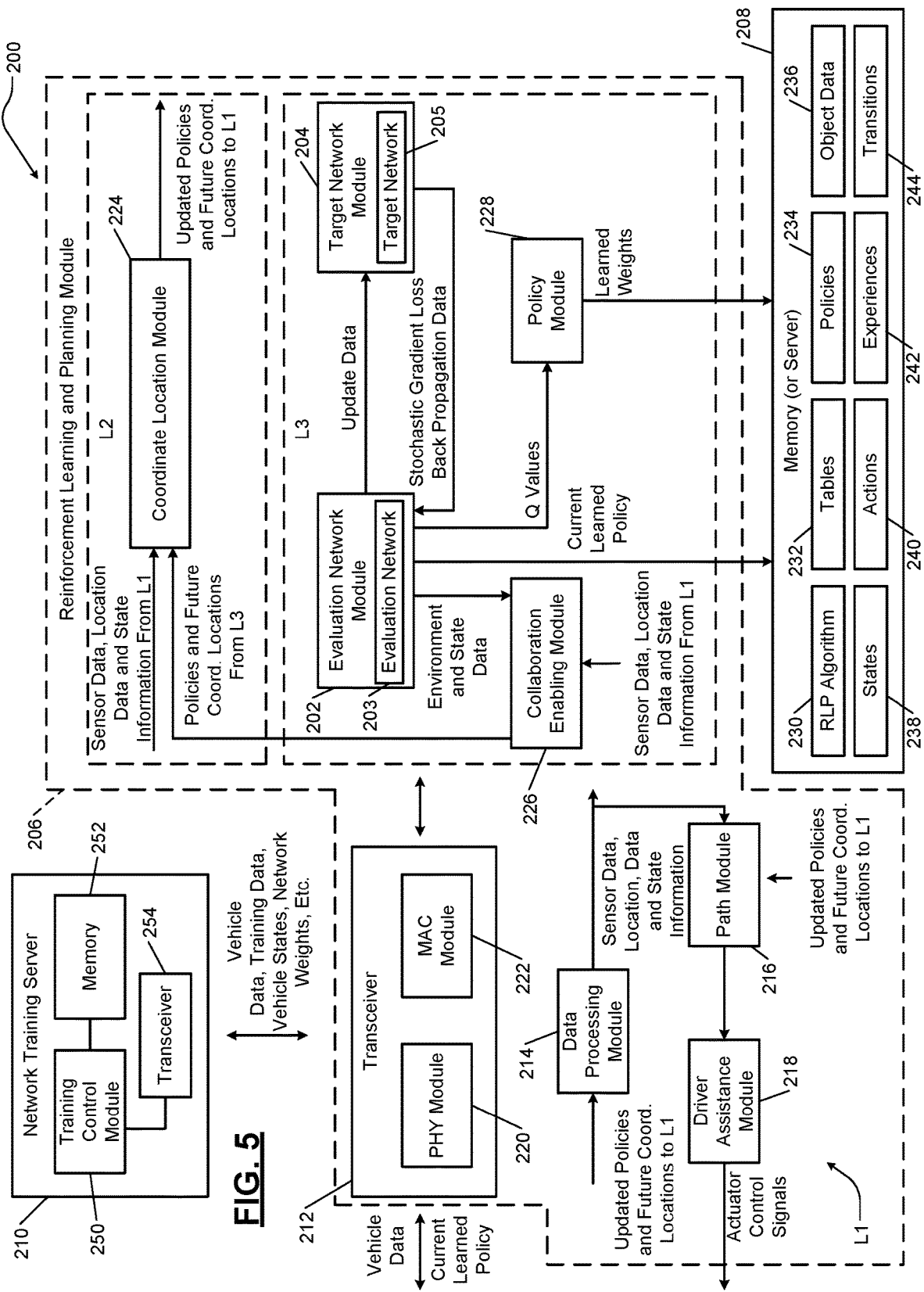
FIG. 5 is a functional block diagram of an example of a multi-level RLP system incorporating dual neural networks in accordance with an embodiment of the present disclosure.

Level L1 determines and/or collects perception information, vehicle states, obstacle states, locations of vehicles, locations of obstacles, and other data and provides this data to the L2 and L3 levels. Level L1 receives updated coordinate locations for each vehicle and obstacle from level L2 and based on this defines a simple path to a location and controls vehicle actuators to follow that intended path. The information and data may be transferred between level L3 and levels L1 and L2 as shown in FIG. 5 or via a robot operating system (ROS) feed of a virtual robot experimentation platform (VREP).

Level L2, in addition to the above data, receives coordinate locations for each of the vehicles and obstacles from level L3 for a particular time in the future, which is tuned for performance based on communication and processing speeds of the modules of the corresponding vehicles. Level L2 is responsible for high-speed responses, smooth path planning, and obstacle avoidance. Level L2 treats level L3 directives including the coordinate locations as objectives to attempt to achieve. Level L2 places a higher priority on avoiding a collision if a conflict with L3 objectives exists. Level L2 updates the coordinate locations to provide the updated coordinate locations. Level L2 may feed information regarding an emergency maneuver back to level L3 to improve tuning of reinforcement learning rewards. Continuous learning feedback for reinforcement learning is provided. If reinforcement learning results in a "bad decision", then a correction is made at lower level control and a policy is modified for a new reinforcement learning decision.

Level L3, in addition to receiving the perception information, vehicle states, obstacle states, locations of vehicles, locations of obstacles, and other data also receives collision avoidance information and other statistical information form level L2. Level L3 tunes rewards of a policy based on this information and data as further described below. A reward refers to a positive or negative feedback through interaction in an environment. A programmer may define rewards/punishments for actions. A mapping between actions and rewards and/or punishments may be stored in the memory 208. The actions performed that yielded high or low rewards may also be stored in the memory 208. As an example, rewards may be generated based on a predetermined reward function. The rewards may be determined by, for example, the RLP module 206 or some other module of the vehicle. An agent may receive and/or generate a reward for each action performed by the agent. A reward may be in the form of a scoring value (e.g., a value between 0 and 1 or a value between −1 and 1) for a particular set of one or more actions performed by a vehicle. In an embodiment, a positive value refers to a reward and a negative value refers to a punishment. A policy refers to a planned set of paths and corresponding actions to be taken for each vehicle in an environment.

Level L3 determines the coordinate locations to level L2 based on the stated information and data. The coordinate locations are for each vehicle and obstacle at a fixed point in the future. These are objectives given a current understanding of an entire state space of the system as provided by a model of the system. Level L3 uses RL to learn higher-level vehicle coordination policies from learning datasets provided via simulation or real-traffic recorded data. Policies are transferred real-time to automated vehicles in a multi-vehicle and multi-lane environment. Level L3 controls a highest level of abstraction for the vehicles, which is a spatial formation the vehicles are attempting to maintain at any moment in time. One global policy can be learned from the experiences of all of the vehicles in a simulation or in an actual driving scenario and transferred to the vehicles. Collective results of local policies results in emergent collaborative driving behavior of the vehicles as a highest priority while satisfying safety critical obstacle objectives.

Examples of the levels L1-L3 are shown in FIG. 5 and further described below with respect to FIGS. 5-8.

As shown in FIG. 3, level L1 may receive signals including information and data from and/or associated with multiple vehicles 74 and obstacles 76. This is represented by dashed signal lines 78. Shared information and data may be provided from level L1 to the vehicles 74, as represented by solid signal lines 80.

Figure 4:
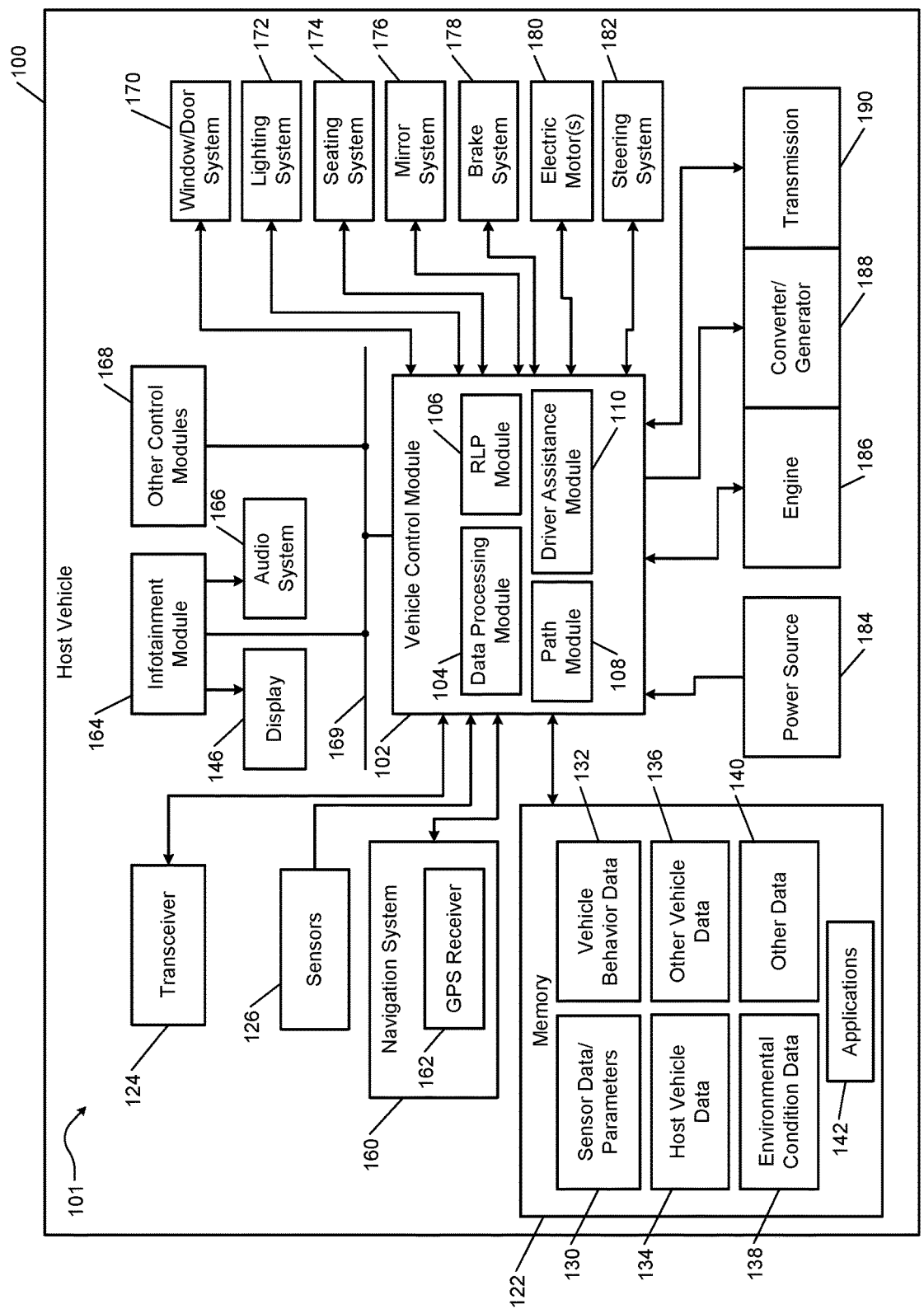
FIG. 4 is a functional block diagram of an example of a host vehicle incorporating a driver assistance system including a data processing module, a RLP module, a path module and a driver assistance module operating in accordance with an embodiment of the present disclosure.

FIG. 4 shows a host vehicle 100 including a vehicle assistance system 101 incorporating a vehicle control module 102 including a data processing module 104, a RLP module 106, a path module 108 and a driver assistance module 110. The data processing module 104 collects data from sensors 126 and stores the sensor data and/or associated parameters in a memory 122. The RLP module 106 performs collaborative RL operations including performing a collaborative RLP algorithm that is described with respect to FIG. 7. The path module 108 determines current and future paths of the host vehicle 100 and other nearby vehicles. The driver assistance module 110 controls actuators to follow certain policy objectives and a corresponding path for the host vehicle.

The host vehicle 100 may include the memory 122, a transceiver 124, sensors 126, and a display 146. The memory 122 may store, for example, data referred to herein including: vehicle sensor data and/or parameters 130; vehicle behavior data 132 of the host vehicle 100 and/or of other vehicles; host vehicle data 134; data of other vehicles 136; environmental condition data 138; and other data 140. Examples of other data are shown in FIG. 5. The stated vehicle data may include vehicle-to-vehicle data transmitted between vehicles via the transceiver 124. The memory 122 may also store applications 142, which may be executed by the vehicle control module 102 to perform operations described herein.

The sensors 126 may include, for example, a speed sensor, an acceleration sensor, proximity sensors, an accelerator pedal position sensor, a brake pedal position sensor, a steering wheel position sensor, etc. The sensors 126 may include cameras, objection detection sensors, temperature sensors, accelerometers (or acceleration sensors for detecting acceleration in X, Y, Z directions or yaw, pitch and roll), a vehicle velocity sensor and/or other sensors that provide parameters and/or data associated with the state of the vehicle 100, states of objects (e.g., obstacles, animate objects, vehicles, etc.) near the vehicle 100, and/or information regarding an environment in which the vehicle 100 is located. The sensors 126 detect environmental conditions and status of vehicle devices.

The display 146 may be a display on a dashboard of the host vehicle 100, a heads-up-display, or other display within the host vehicle 100 and used to provide driver assistance signals to a vehicle operator. Driver assistance signals may be generated by the driver assistance module 110 and indicated via an infotainment module 164 on the display 146 and/or the audio system 166.

The host vehicle 100 may further include a navigation system 160 with a global positioning system (GPS) receiver 162, the infotainment module 164, the audio system 166 and other control module 168, such as an engine control module, a transmission control module, a motor control module, an autonomous control module, a hybrid control module, etc. The navigation system 160 and GPS receiver 162 may be used to monitor locations of the host vehicle 100 and other vehicles and predict paths of the host vehicle 100 and the other vehicles. The GPS receiver 162 may provide velocity and/or direction (or heading) of the host vehicle 100. The display 146, the infotainment module 164, and the audio system 166 may be used to alert a drive of the host vehicle 100 and/or to receive requests from the driver.

The host vehicle 100 may include a window/door system 170, a lighting system 172, a seating system 174, a mirror system 176, a brake system 178, electric motors 180, a steering system 182, a power source 184, an engine 186, a converter/generator 188, a transmission 190, and/or other vehicle devices, systems, actuators, and/or components. The stated items 170, 172, 174, 176, 178, 180, 182, 186, 188, 190 may be controlled by the vehicle control module 102 and/or the driver assistance module 110. The driver assistance module 110 may select a course of action and signal one or more of the stated items to perform certain actions. As an example, the driver assistance module 110 may decide to merge the vehicle 100 into an adjacent lane and/or to turn the host vehicle 100 to avoid a collision. This may include signaling the steering system 182 to steer the vehicle into the adjacent lane or to make a left or right turn. The driver assistance module 110 may signal the stated items to perform various autonomous operations.

The vehicle control module 102, the infotainment module 164, and other control modules 168 may communicate with each other via a controller area network (CAN) bus 169. The vehicle control module 102 may communicate with vehicle control modules of other vehicles via the transceiver 124. The vehicle control modules may share information regarding location, speed, acceleration, heading, predicted path, and/or other vehicle related information for each corresponding vehicle and/or other detected vehicles.

The vehicle control module 102 may control operation of the items 170, 172, 174, 176, 178, 180, 182, 186, 188, 190 according to parameters set by the vehicle control module 102 and/or one or more of the other modules 168. The vehicle control module 102 may receive power from a power source 184 which may be provided to the engine 186, the converter/generator 188, the transmission 190, the window/door system 170, the lighting system 172, the seating system 174, the mirror system 176, the brake system 178, the electric motors 180 and/or the steering system 182, etc.

The engine 186, the converter/generator 188, the transmission 190, the window/door system 170, the lighting system 172, the seating system 174, the mirror system 176, the brake system 178, the electric motors 180 and/or the steering system 182 may include actuators controlled by the vehicle control module 102 to, for example, adjust fuel, spark, air flow, throttle position, pedal position, door locks, window position, seat angles, lumbar support positions and/or pressures, mirror position, stereo presets, etc. This control may be based on the outputs of the sensors 126, the navigation system 160, and the GPS receiver 162. The stated control may also be performed to match parameters of a user profile, which may be adjusted by a user. The audio system 166 may include a stereo having channel presets and volume settings that may be set by a user and adjusted according to a user profile by one or more of the modules 102, 168.

The driver assistance module 110 may assist a driver of the host vehicle 100 by (i) passively signaling the driver with suggested operations to perform and/or warning messages, and/or (ii) actively assisting and/or controlling operations of one or more actuators and/or devices of the vehicle 100, such as one or more of the items 170, 172, 174, 176, 178, 180, 182, 186, 188, 190. This may include adjusting set parameters of the host vehicle 100. The driver assistance module 110 may communicate with and/or receive vehicle behavior signals, path prediction signals, decision signals, path negotiation signals, policy negotiation signals, driver assistance signals, and/or other signals from other vehicles and/or network devices (e.g., mobile devices, cloud-based devices, etc.) described herein via the transceiver 124. Similar signals may also be transmitted from the driver assistance module 110 to other vehicles via the transceiver 124.

FIG. 5 shows a multi-level RLP system 200 (hereinafter referred to as "RLP system 200) incorporating a level L3 with dual neural network modules 202, 204 having respectively an evaluation network 203 and a target network 205. The RLP system 200 includes a RLP module 206 having levels L1-L3, a memory or server 208 and a network training server 210. The items stored in the memory 208 may be stored similarly in the memories 36 and 122 of FIGS. 1 and 4.

The levels L1-L3 are examples of the levels L1-L3 shown in FIG. 3. Level L1 may include a transceiver 212, a data processing module 214, a path module 216 and a driver assistance module 218. The transceiver 212 may include a physical layer (PHY) module 220, and a medium access control (MAC) module 222. Although shown as part of the RLP module 206, the transceiver 212 may be separate from the RLP module 206. The modules 214, 216 218 are examples of the modules 104, 106, 108 of FIG. 4. The PHY module 220 transmits and receives object data and information disclosed herein, policies, training data, vehicle states, vehicle actions, weights of the networks 202, 204, etc. to and from the network training server 210, other vehicles, network servers, road side units, etc.

Level L2 may include a coordinate location module 224. The coordinate location module 224 updates future coordinate locations received from the collaboration enabling module 226 to provide updated future coordinate locations. The coordinate location module 224 may also provide updated policies. These actions are performed based on the received sensor, coordinate location data of objects, state information of vehicles, policies and future coordinate locations, etc. Level L2 may attempt to implement the decisions of level L3. For example, if the collaboration enabling module determines that other vehicles are in close proximity to the host vehicle and/or the other vehicles are autonomous vehicles capable of sharing state information, then collaboration between the host vehicle and the other vehicles is enabled. This may include an exchange of signals for making path decisions.

Level L3 may include an evaluation network module 202, a target network module 204, a collaboration enabling module 226 and a policy module 228. Level L3 may attempt to implement the decisions of level L1. The evaluation network module 202 may be implemented as a first neural network having a first set of weights. The target network module 204 may be implemented as a second neural network having a same structure as the first neural network and a second set of weights different than the first set of weights. The target and evaluation networks 203, 205 have 5 hidden layers. All of the hidden layers are fully connected and a corresponding rectified linear unit (ReLU) implements an activation function. The layers of the evaluation networks 203 are connected. The layers of the target network 205 are connected. In each of the evaluation and target networks 203, 205, the nodes of a layer are connected to the nodes of a previous layer. Fully connected refers to fully connecting the neurons in a previous layer to the neurons in a current layer. Each neuron in the output layer of the 5 layers corresponds to a separate action variable. For the multi-agent aspect of the RLP algorithm (or multi-agent collaborative DQN with PER algorithm), the two deep layers on the DQN for each of the vehicles is used for collaboration purposes. Each of the 5 layers is a multi-level perceptron that incorporates its own non-linearity in a classifier function, which cannot be contained in a single layer. Adding more non-linearity is useful for the RLP algorithm, but there is a tradeoff between this computational complexity, which increases with an increase in a number of layers. The best value is heuristically determined to be 5.

For collaboration, the agent/state space is augmented to include actions of other friendly (or autonomous) vehicles in order to decide on the action to be taken for a given vehicle. The operations performed for collaboration include: 1) for each agent vehicle, add actions of other agents (F1; F2; FN) to the state in which the decision/action for the given agent is chosen; 2) once the actions of the agents are sampled from the current state, sample the action from Q(s; a) for the current agent; and 3) continue the RLP algorithm.

Three different exponential domains may be used to gauge performances of different algorithms. A first domain may refer to the multi-agent collaborative DQN with PER algorithm as disclosed herein, which may be compared to the performances of other multi-agent DQN algorithms (or a second domain) and/or a DQN with PER algorithm (or a third domain). The third domain refers to a single non-collaborative DQN. The DQN with PER algorithm of the third domain is a simple implementation of a DQN policy for a single vehicle without accounting for other vehicles.

The evaluation network module 202 (i) receives stochastic gradient loss back propagation data from the target network module 204, (ii) determines first Q values and provides the first Q values to the policy module 228, (iii) stores a current learned policy in the memory 208, (iv) sends environment and state data to the collaboration enabling module 226, and (v) provides updated data to the target network module 204. The sending of updated data to the target network module 204 may include setting Q values of the target network module 204 to the Q values of the evaluation network module 202. A Q value or Q(s, a) refers to how good it is to take a particular action for a particular state, where 's' is the state and 'a' is the action performed. The collaboration enabling module 226 determines the policies and future coordinate locations based on the environment and state data, the sensor data, location data, and state information.

The policy module 228 based on the Q values received from the evaluation network module 202 determines (or learns) weights to be stored in the memory 208 and applied at nodes of the neural networks of the network modules 202, 204. The weights of the neural network of the target network module 204 may be different than the weights of the evaluation network module 202.

The policy module 228 may also determine policies 234 to follow and store the policies 234 in the memory 228. A policy is a function that maps states to actions. The function returns one of multiple possible actions when an agent queries the policy using a current state of the agent. The neural networks are non-linear function approximating networks that represent a function in an algorithm. The evaluation network 203 weights and approximates a current policy of an agent. The collaboration enabling module 226 enables collaboration and causes a group of vehicles including a host vehicle to collaborate with each other to avoid obstacles and rogue vehicles. When disabled, the vehicles do not collaborate. The current learned policy signal transmitted from the evaluation network module 202 to the memory is a most recent policy estimate. This estimate is updated at each training step or iteration of operations 408, 410, 412, 414, 416, 418, 420, 422, 424, 426, 428, 430, 432, 434, 436 of FIG. 7.

The memory 208 may be referred to as and/or include an experience replay memory. The memory 208 may store the RLP algorithm 230, tables 232, policies 234, object data 236 (animate and inanimate object data include vehicle data, obstacle data, etc.), states 238, actions 240, experiences 242, transitions 244, etc.

The network training server 210 may be implemented by the service provider 22 of FIG. 1 and/or in the cloud-based network 52 of FIG. 2. The network training server 210 may include a training control module 250, a memory 252 and a transceiver 254. The training control module 250 may train the neural networks of the network modules 202, 204.

The RLP module 206 may execute the RLP algorithm 230, which is a collaborative prioritized experience replay type algorithm that is used in each operating environment. This is different from a simple DQN with prioritized experience replay as described in the International Conference on Learning Representations (ICLR) 2016 conference paper titled "Prioritized Experience Replay" by Tom Schaul, John Quan, Ioannis Antonoglou and David Silver. This is because the disclosed RLP algorithm is a multi-agent and collaborative based algorithm. For the multi-agent aspect of the disclosed systems, there are a certain number of different autonomous agents (e.g., four vehicles with corresponding modules) that are collaboratively avoiding a rogue vehicle.

The autonomous agents share state and action information with other vehicles. The autonomous agents perform reinforcement learning that treats the system of vehicles as a Markov design process, where each vehicle interacts independently in the system and the system can be described by multiple tuples (S, A, T, R), where S is a state of a corresponding vehicle, A is an action to be performed by the corresponding vehicle, T refers to a state transition dynamics function (also referred to as dynamics) of the corresponding vehicle, and R is a reward value for performing the action A for the state S. T indicates how the state changes given actions performed by the corresponding vehicle (or agent). A Markov decision process (MDP) defines a system with states, actions (or decisions), dynamics and rewards <S, A, T, R>. Reinforcement learning is a family of decision making methods for finding an optimal policy for taking actions in an MDP to maximize expected rewards over time using only experience and rewards. A state action value $Q^\pi(s_t, a_t)$ is an estimate of expected value of taking an action at a particular state and following a policy $\pi(a_t|s_t, \theta_t)$ from then onwards. In an embodiment, a goal is to optimize a Q value of a policy, for example, optimizing the Q value of equation 1, where a next action $a_{t+1}$ comes from the current policy $\pi$, $\gamma$ is a discount factor.

$$Q(s, a) = r(s, a) + \gamma \sum_{s_{t+1}} T(s_{t+1}, s_t, a_t) Q(s_{t+1}, at+1) \qquad (1)$$

The current policy $\pi$ refers to currently learned parameters of a policy function which determines how a vehicle behaves given a state of the vehicle. These parameters are updated as the RLP module 206 implementing the RLP algorithm learns and as such a new policy is being created at any moment in time. The discount factor is a bound in reinforcement learning that makes the RLP algorithm converge by making an infinite sum finite. Normally reinforcement learning agents optimize the discounted reward rather than the simple rewards, as without the discount factor. The discount factor is used to indicate relative importance of most recent rewards as compared to obtainable future rewards. The discount factor may have a value between 0 and 1, where 1 means that the future rewards dominate whereas a value of 0 means that only the most recent rewards matter. In one embodiment, the discount factor is 0.9. The Q values representing a value of taking action at a state diverge.

As an example, when an environment has multiple vehicles, state inputs for a first vehicle may include: X, Y distances between the first vehicle and the other vehicles; X, Y distances between the first vehicle and obstacles; X, Y distances from the first vehicle to a left edge of a treadmill (or road), X, Y distances from the first vehicle to a right edge of the treadmill (or road); X, Y distances from the first vehicle to a top of the treadmill or road (or highest point of a road surface as seen on a screen); X, Y distances from the first vehicle to a bottom of the treadmill or road (or highest point of a road surface as seen on a screen); and X, Y distances to lane edges. Action inputs for the first vehicle may include: actions of each of the other vehicles; all available inputs defining a state of the first vehicle. A treadmill refers to a simulated continuous highway environment and include multiple lanes of traffic. These inputs may be provided to, for example, level L3 and the network modules 202, 204.

The collaboration enabling module 226 and/or the policy module 228 monitor reward values for collaboration purposes. As an example, Table 1 below includes example events shown in reward based ranking from a most negative ranking (or worst reward value) to a most positive ranking (or best reward value). The precise reward values is a matter of tuning. The rewards may be constrained to be in a range of [−1,1].

TABLE 1

| Reward Ranking | | Event |
|---|---|---|
| Most Negative | --- | Colliding with another vehicle on the treadmill (or road). |
| | -- | Impacting the side of the treadmill (or road) by moving off the treadmill (or road) to the left or the right excluding the situation of a planned exit from the treadmill (or road). |
| | -- | Falling off the treadmill (or road) from the front or back. |
| | - | Driving close to the edges of a lane. |
| | - | Driving close to the edges of the treadmill (or road). |
| Neutral | Even | Maintaining a safe situation (no collision occurred for the recent time period). |
| | + | Successfully returning to a collaborative driving setting to follow. |
| | + | Keeping the lane by staying between lane markings of a current lane if there is no other threat. |

TABLE 1-continued

| Reward Ranking | | Event |
|---|---|---|
| Most Positive | ++ | Successfully changed followed car in a way that minimizes risk of collisions across all nearby cars. |

Tuning may be performed manually based on results and experience or automatically. The object of the tuning is to achieve a target (e.g., no crash). Rewards may be defined by human designers to guide an algorithm to automatically find good policies.

In addition to the states mentioned in Table 1, for collaboration, actions taken by other vehicles are also considered when deciding an action of a host vehicle. The actions of the vehicles are considered part of a state space. Thus, the state space of the first vehicle includes additional information including the actions of the other nearby vehicles.

Figure 6:
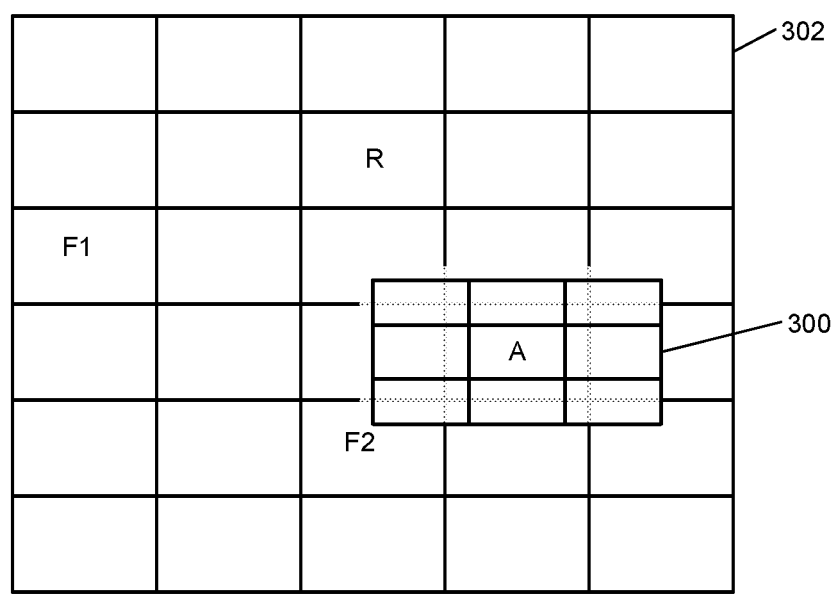
FIG. 6 is a grid representation of a driving domain in accordance with an embodiment of the present disclosure.

An action may involve a movement to a location on a nearby grid having predetermined dimensions (e.g., a 3×3 grid). An example grid representation of a driving domain is shown in FIG. 6. In FIG. 6 an agent vehicle A (or host vehicle) is shown in a first grid 300 for an area close to the vehicle A. Two autonomous agents (or friendly vehicles F1 and F2) and a rogue agent R are shown. The agents (or vehicles) A, F1, F2 are located in a second area represented by a second grid 302 and are collaboratively controlled via communication between the vehicles to negotiate paths, speeds, and movement timing of the vehicles. The first grid 300 is smaller than and within the second grid 302.

The state transition function T (or TS0|S;A) describes a system changing from moment to moment, where S is the previous or current state, S0 is a new or future state, and A is the action taken). The dynamics are provided by a real physical system or simulator. The collaborative RLP algorithm is used to learn from experiences through interactions and as opposed to learning the dynamics provided.

In an embodiment, the collaborative RLP algorithm is a model free deep reinforcement learning method and is "off-policy" in the sense that an explorative operation is performed with epsilon probability at each action performed. The epsilon probability refers to a set low probability of an event happening and means that with a small probability the agent takes an action, which is not a current best choice, to encourage exploration. Thus, the RLP algorithm does not always follow a best policy. With an epsilon probability, the agent takes an exploratory move that is not a best move according to a policy of the agent. This is done to improve learning of an environment by trying out actions, which may not have been tried before.

The associated DQN has two neural networks having a same structure, but with different weights. The neural networks are called the target network 205 and the evaluation network 203, respectively. The target network 205 is considered to provide a stable policy that is updated every predetermined number of actions (or instances). An action may be performed, for example, once every second. The evaluation network 203 is updated every step (or action). The evaluation and target networks 203, 205 refer to the neural networks of the network modules 202, 204, respectively. The evaluation network is a more dynamic network that is updated at each learning step in the RLP algorithm. The target network 205 is a more stable network and is updated once every predetermined number of moves (e.g., 1000 actions). The target network 205 is maintained as a separate network to avoid falling into local feedback loops.

The networks are used to calculate the associated Q values (e.g., $Q_{target}$ and $Q_{eval}$ values). An example of the RLP algorithm is shown in FIG. 7.

Figure 7:
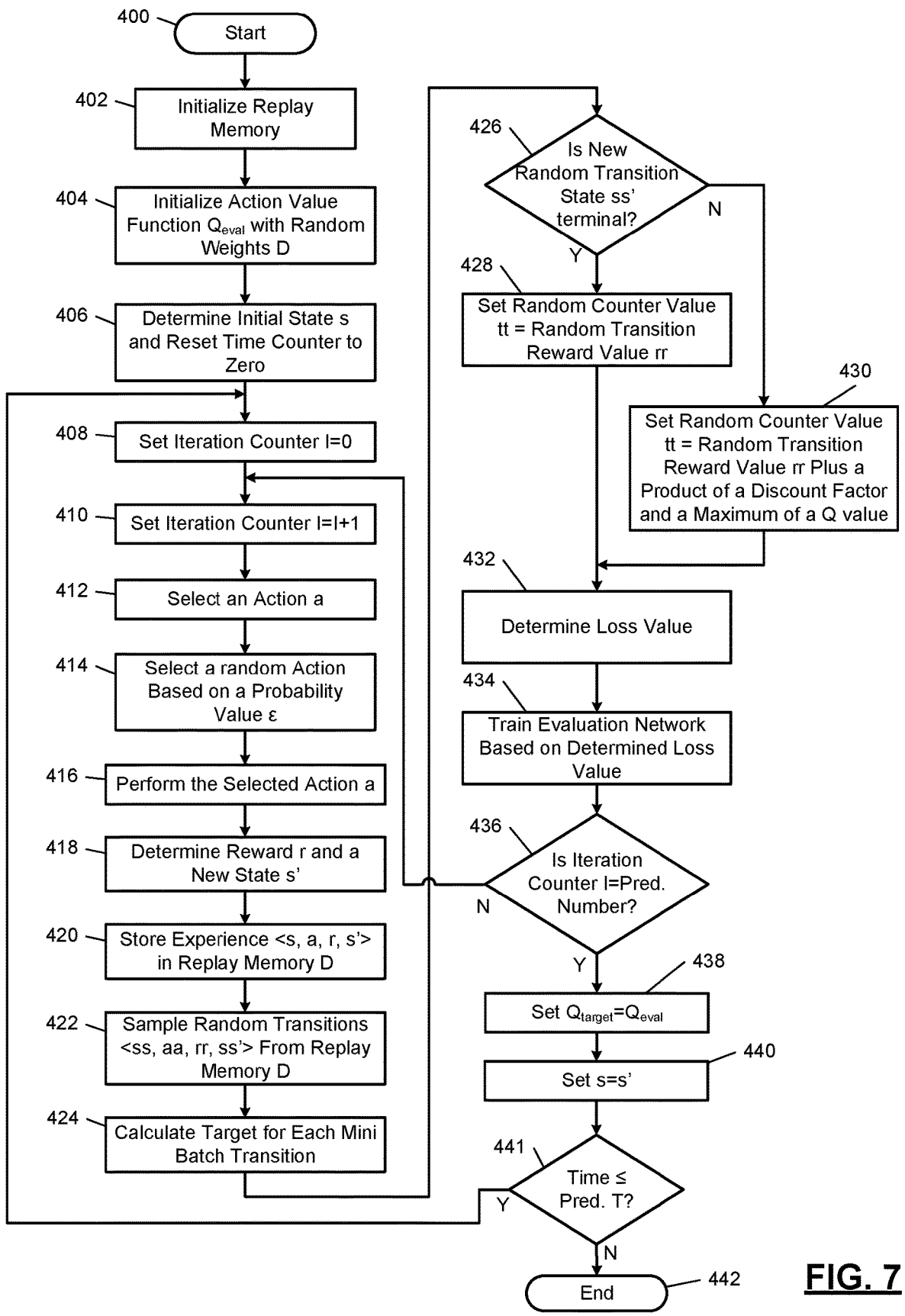
FIG. 7 illustrates a method of operating the driver assistance system of FIG. 4 and the multi-level RLP system of FIG. 5 in accordance with an embodiment of the present disclosure.

The systems disclosed herein may be operated using numerous methods, an example method is illustrated in FIG. 7. FIG. 7 shows a method of operating the driver assistance system of FIG. 4 and the multi-level RLP system of FIG. 5. Although the following operations are primarily described with respect to the implementations of FIGS. 1-8, the operations may be easily modified to apply to other implementations of the present disclosure. The operations may be iteratively performed.

The method may begin at 400. The principle of prioritized experience replay (PER) is used to train the evaluation network 203 of the DQN. The target network 205 of the DQN is not trained. This involves random batches of the memory 208 to be used for training rather than the whole memory 208 for improving learning efficiency of the neural networks. This is because the experience in successive steps may not be too different from each other. A separate target network 205 is used as the stable network and for calculating a loss value, as described below. If the evaluation network 203 keeps changing, then a whole system would fall into local feedback loops.

PER is implemented to weight the different experiences with the probability of the absolute value of error between the $Q_{target}$ and calculated $Q_{eval}$ values. PER is enabled in the RLP algorithm and provides the ability to do priority based sampling from experience replay, instead of uniform sampling, as previously done in a simple DQN algorithm. The higher the probability of a node of the neural network, the higher the probability of the node being chosen in a mini batch sample. Mini batch sampling is a type of preprocessing of data used for training a network to help finding coefficients (or weights). A mini-batch gradient descent is a variation of the gradient descent algorithm that splits the training dataset into small batches, which are used to calculate model error and update model weights.

Also, a double DQN algorithm is available for use as a parameter choice which further stabilizes the multi-agent collaborative DQN with PER algorithm disclosed herein. The multi-agent collaborative DQN with PER algorithm may overestimate the sub-optimal actions. A double DQN having two neural networks uses a first (or separate) network for choosing an action and a second (or different) network for calculating a Q value. This does not suffer from the problem of overestimation.

At 402, a replay memory (e.g., the memory 204) is initialized. This may include initializing variables and/or parameters, resetting counters, storing data and/or information collected in the memory, etc. At 404, an action value function (or the first neural network) of the evaluation network module 202, associated with the $Q_{eval}$ values, is initialized with random weights D.

At 406, an initial state s of the host vehicle 100 is determined and a reset time counter is set to zero. The initial state may be determined by, for example, a data processing module (one of the data processing modules 104, 214). To determine the initial state s of the host vehicle, the vehicle control module 102 and/or the data processing module receives and/or monitors data, which may include simulation data, open source data, testing data, historical data, sensor data, position data, vehicle state data, vehicle action data, path information, vehicle decisions, etc. and/or other data describing different aspects of an environment. The stated data may be of the host vehicle 100 and/or other vehicles and objects. This data may include data pertaining to the host vehicle 100 and other vehicles and objects near the host vehicle. The data may be stored in the memory 122 and may be received from modules within the host vehicle 100 and/or a remote network device via the transceiver 124. The data may include, for example, vehicle acceleration data, vehicle velocity data, vehicle heading data, vehicle position data, etc. The data processing module may receive data from the GPS receiver 162. The data may also include data received from and/or shared by one or more other vehicles. At 408, the RLP module 206 and/or the evaluation network module 202 sets an iteration (or event) counter I equal to zero.

At 410, the RLP module 206 and/or the evaluation network module 202 sets the iteration counter I equal to I plus one. At 412, the RLP module 206 and/or the evaluation network module 202 selects an action a corresponding to equation 2.

$$a = \arg\max'_a Q_{eval}(s, a') \quad (2)$$

At 414, the RLP module 206 and/or the evaluation network module 202 selects a random action with probability ϵ. At 416, level L1 via the transceiver 212 instructs the driver assistance module 110 to perform the action 'a' selected at 412.

At 418, the RLP module 206 and/or the evaluation network module 202 observes a reward r and new state s'. At 420, the RLP module 206 and/or the evaluation network module 202 stores an experience tuple <s, a, r, s'> in the memory 208.

At 422, the RLP module 206 and/or the evaluation network module 202 samples random transitions <<ss, aa, rr, ss'> from the memory 208. At 424, the target network module 204 calculates a target value for each mini batch transition.

At 426, the RLP module 206 determines whether a new random transition state ss' terminal. If the new random transition state ss' is terminal, then operation 428 is performed, otherwise operation 430 is performed. At 428, the RLP module 206 sets a random counter value tt equal to a random transition reward value rr. At 430, the RLP module 206 sets the random counter value tt equal to the random transition reward value RR plus a product of the discount factor γ and a maximum of a Q value, as represented by equation 3.

$$tt = rr + \gamma \max'_a Q(ss', aa') \quad (3)$$

At 432, the RLP module 206, the target network module 204, and/or the target network 205 determines a loss value, which may be equal to a difference between $Q_{target}$ and $Q_{eval}$ of the evaluation and target networks 203, 205. In one embodiment, the loss value is determined according to equation 4.

$$\text{Loss} = \frac{1}{2}(tt - Q(ss, aa))^2 \quad (4)$$

At 434, the evaluation network 203 is trained based on the determined loss value. The loss value is used to update the evaluation network 203 based on a stochastic gradient back propagation operation. Back propagation is used to train the evaluation network 203, which includes updating the weights of the evaluation network 203.

At 436, the RLP module 206 and/or the evaluation network module 202 determines whether the iteration counter I is equal to a predetermined number (e.g., 1000). After every fixed number of iterations, (e.g., 100 or 1000 iterations) the evaluation network parameters. The policy may be iteratively refined over several thousands of iterations before an acceptable policy is learned. If this is TRUE, then operation 438 is performed, otherwise operation 440 is performed.

At 438, the target network module 204 sets $Q_{target}$ equal to $Q_{eval}$. The weights of the evaluation network 203 are copied over to the target network 205 and become the new weights of the target network 205. At 440, the RLP module 206 and/or the evaluation network module 202 sets the state s equal to the new state s'.

At 441, the RLP module 206 and/or the evaluation network module 202 determines whether the time counter is less than or equal to a predetermined amount of time. If the time counter is less than or equal to the predetermined amount of time, then operation 408 is performed, otherwise the method may end at 442.

The above-described operations of FIG. 7 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Figure 8:
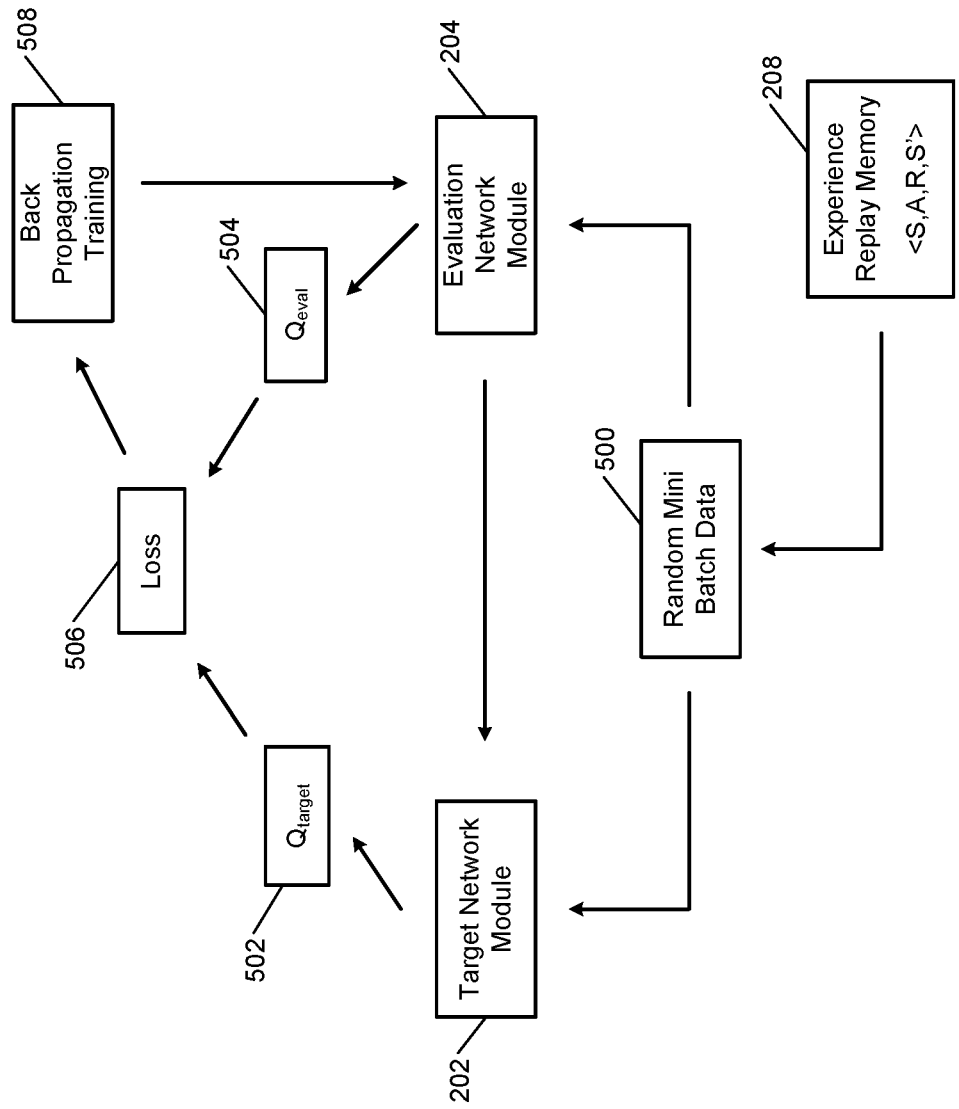
FIG. 8 is a data flow diagram illustrating determination of Q and loss values associated with the dual neural networks of the multi-level RLP system of FIG. 5 in accordance with an embodiment of the present disclosure.

FIG. 8 is a data flow diagram illustrating determination of Q and loss values associated with the dual neural networks of the multi-level RLP system of FIG. 5. In FIG. 8, the random mini batch data is collected from the experience replay memory 208 and provided as input data to the network modules 202, 204 and/or corresponding neural networks. Each mini batch of data may include, for example, 32 bits of data.

The network modules 202, 204 and/or the corresponding neural networks determine $Q_{target}$ (designated as 502) and $Q_{eval}$ (designated as 504), which as described above are then used to determine the loss value (designated as 506). The target network module 204 receives the $Q_{eval}$ and weights of the evaluation network module 202 after every predetermined number of iterations and/or events (e.g., 500 iterations of operations 408, 410, 412, 414, 416, 418, 420, 422, 424, 426, 428, 430, 432, 434, 436 of FIG. 7).

Simulator

The method of FIG. 7 may be applied to a driving simulation environment via a driving simulator. The driving simulator may include the RLP system architecture shown in FIG. 3 and VREP software. As an example, the simulator may have 5 vehicles running in parallel on a treadmill, where a goal of each of the vehicles is to: avoid hitting the other vehicles, avoid coming in contact with edges of the treadmill; and maintain driving in a current lane of traffic. Four of the vehicles may be autonomous (or self-driving) vehicles. The four autonomous vehicles share state information and next possible moves and/or intended actions with each other. The fifth vehicle may be a rogue vehicle that is manually driven or the simulator randomly assigns goal points for the same. The aim of the rogue vehicle is to collide into any of the other vehicles. The four autonomous vehicles avoid the rogue vehicle via collaborative maneuvers on the treadmill.

The implementation of reinforcement learning in the stated example simulation environment demonstrates how machine learning can be used to learn high-level vehicle coordination policies from simulated experiences and transfer the policies to a real-time multi-vehicle and multi-lane environment. Reinforcement learning methods as used for finding optimal decision policies from dynamic systems when full mathematical formulation of the dynamics or the global objective functions are not available. Instead of calculating an optimal, closed form solution, reinforcement learning algorithms are used to learn a similar manner as humans and animals through interacting with the environment and receiving positive or negative feedback. The feedback refers to the rewards above-described. Learning involves remembering an abstract mapping from states and actions that yielded high or low rewards. The goal is to find a policy that maximizes the expected rewards over time. The reinforcement learning planner will control the highest level of abstraction for the vehicles which will be the spatial formation the vehicles are attempting to maintain at any time. Actions at this level are prioritized by importance. Additional situations may be added as the system is developed. FIG. 6 provides an example grid representation of the corresponding domain.

Rewards (positive feedback) or penalties (or negative feedback) for events is provided. The positive and negative feedback may be generated internally to each vehicle and/or provided to a vehicle by another vehicle, roadside unit, and/or remote server (e.g., service provider server or cloud-based network server). The reward values may be generated by a vehicle control module, a driver assistance module, a server control module, and/or other controller monitoring results of actions performed and providing feedback on the results. The events are ordered from most negative to most positive. The precise reward values are a matter of tuning. The rewards may be constrained to be in a range [−1,1]. An applied reward function may be based on a table of rankings, such as that shown by Table 1. Actions that lead to a collision result in negative feedback. Actions that lead to safe driving behaviors result in positive feedback.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A reinforcement learning and planning (RLP) system for a host vehicle, the RLP system comprising:
 a memory configured to store a RLP algorithm, which is a multi-agent collaborative deep Q network (DQN) with prioritized experience replay (PER) algorithm; and
 a plurality of levels including a first level, a second level, and a third level, wherein
  the first level comprises a data processing module configured to provide sensor data, object location data, and state information of a plurality of vehicles including the host vehicle and multiple other vehicles,
  the second level comprises a coordinate location module configured to, based on the sensor data, the object location data, the state information, and a refined policy provided by the third level, generate an updated policy and a first set of future coordinate locations to be implemented via the first level,
  the third level comprises an evaluation network, a target network, and a processor configured to execute instructions of the RLP algorithm (i) for collaborative action planning between the host vehicle and the other vehicles based on outputs of the evaluation network and the target network, and (ii) to generate the refined policy based on reward values associated with a plurality of events,
  the evaluation network and the target network are neural networks that implement Q-learning, and
  the processor is configured to execute the instruction to determine a loss value,
   train the evaluation network over the plurality of events based on the loss value,
   modify the refined policy based on reward values after each of the plurality of events, and
   after a predetermined number of events, set a first Q value of the target network equal to a second Q value of the evaluation network, wherein the first Q value of the target network refers to a state and an action of the host vehicle, and wherein the second Q value of the evaluation network refers to the state and the action of the host vehicle.

2. The RLP system of claim 1, wherein the evaluation network has a same structure as the target network, but a different set of weights.

3. The RLP system of claim 1, wherein the processor is configured to:
 during training of the evaluation network, update weights of the evaluation network; and
 after the predetermined number of events, match weights of neurons of the target network to weights of neurons of the evaluation network.

4. The RLP system of claim 1, wherein the processor does not train the target network.

5. The RLP system of claim 1, wherein:
 the evaluation network is configured to set the second Q value based on the sensor data, the object location data, and the state information;
 the target network is configured to set the first Q value based on the sensor data, the object location data, and the state information; and
 the loss value is determined based on a difference between the first Q value and the second Q value.

6. The RLP system of claim 1, wherein:
 the processor is configured to determine the loss value based on a discount factor; and
 the discount factor indicates a relative importance of a most recent reward as compared to a future obtainable reward.

7. The RLP system of claim 1, further comprising a collaboration enabling module configured to (i) enable collaboration between the host vehicle and the other vehicles, and (ii) provide the refined policy and a second set of future coordinate locations to the second level.

8. The RLP system of claim 7, wherein the coordinate location module is configured to provide the updated policy and the first set of coordinate locations based on the sensor data, the object location data, the state information, and the second set of future coordinate locations.

9. The RLP system of claim 1, wherein the third level is configured to enable collaboration between the host vehicle and the other vehicles based on the sensor data, the object location data, and the state information.

10. The RLP system of claim 1, further comprising a driver assistance module configured to implement the updated policy and future coordinate locations by controlling a plurality of actuators of the host vehicle to follow a determined path of the updated policy.

11. A method of operating a host vehicle, the method comprising:

storing a reinforcement learning and planning (RLP) algorithm, which is a multi-agent collaborative deep Q network (DQN) with prioritized experience replay (PER) algorithm;

at a first level, providing sensor data, object location data, and state information of a plurality of vehicles including the host vehicle and multiple other vehicles;

at a second level and based on the sensor data, the object location data, the state information, and a refined policy provided by a third level, generating an updated policy and a first set of future coordinate locations to be implemented via the first level;

at the third level, executing instructions of the RLP algorithm via a processor (i) for collaborative action planning between the host vehicle and the other vehicles based on outputs of an evaluation network and a target network, and (ii) to generate the refined policy based on reward values associated with a plurality of events, wherein the third level comprises the evaluation network and the target network, and wherein the evaluation network and the target network are neural networks;

determining a loss value;

training the evaluation network over the plurality of events based on the loss value;

modifying the refined policy based on reward values after each of the plurality of events; and after a predetermined number of events, setting a first Q value of the target network equal to a second Q value of the evaluation network, wherein the first Q value of the target network refers to a state and an action of the host vehicle, and wherein the second Q value of the evaluation network refers to the state and the action of the host vehicle.

12. The method of claim 11, further comprising implementing the updated policy and future coordinate locations by controlling a plurality of actuators of the host vehicle to follow a determined path of the updated policy.

13. The method of claim 11, wherein the evaluation network has a same structure as the target network, but a different set of weights.

14. The method of claim 11, further comprising:

during training of the evaluation network, updating weights of the evaluation network; and after the predetermined number of events, match weights of neurons of the target network to weights of neurons of the evaluation network.

15. The method of claim 11, further comprising:

setting the second Q value via the evaluation network based on the sensor data, the object location data, and the state information; and setting the first Q value via the target network based on the sensor data, the object location data, and the state information, wherein the loss value is determined based on a difference between the first Q value and the second Q value.

16. The method of claim 11, further comprising determining the loss value based on a discount factor, wherein the discount factor indicates a relative importance of a most recent reward as compared to a future obtainable reward.

17. The method of claim 11, further comprising, at the second level:

enabling collaboration between the host vehicle and the other vehicles;

providing the refined policy and a second set of future coordinate locations to the second level; and providing the updated policy and the first set of future coordinate locations based on the sensor data, the object location data, the state information, and the second set of future coordinate locations.

18. The method of claim 11, wherein the third level is configured to based on the sensor data, the object location data, and the state information enable collaboration between the host vehicle and the other vehicles.

* * * * *